(12) United States Patent
Wong et al.

(10) Patent No.: US 11,044,623 B2
(45) Date of Patent: Jun. 22, 2021

(54) DEVICES AND METHODS FOR STOPPING CQI MEASUREMENTS ACCORDING TO BATTERY LEVEL OR UE MOBILITY IN A MULTICARRIER SYSTEM

(71) Applicant: Convida Wireless, LLC, Wilmington, DE (US)

(72) Inventors: Shin Horng Wong, Basingstoke (GB); Martin Warwick Beale, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 609 days.

(21) Appl. No.: 15/746,044

(22) PCT Filed: Jul. 21, 2016

(86) PCT No.: PCT/EP2016/067391
§ 371 (c)(1),
(2) Date: Jan. 19, 2018

(87) PCT Pub. No.: WO2017/029067
PCT Pub. Date: Feb. 23, 2017

(65) Prior Publication Data
US 2018/0213428 A1 Jul. 26, 2018

(30) Foreign Application Priority Data

Aug. 14, 2015 (EP) .................................. 15181121

(51) Int. Cl.
*H04W 24/10* (2009.01)
*H04W 4/70* (2018.01)
(Continued)

(52) U.S. Cl.
CPC .......... *H04W 24/10* (2013.01); *H04L 1/0026* (2013.01); *H04L 1/0027* (2013.01);
(Continued)

(58) Field of Classification Search
None
See application file for complete search history.

(56) References Cited

U.S. PATENT DOCUMENTS

2011/0237202 A1* 9/2011 Uemura ................ H04W 24/08
455/67.14
2013/0102322 A1* 4/2013 Nakamori ............. H04L 5/0037
455/455
(Continued)

FOREIGN PATENT DOCUMENTS

EP    2654350 A1 * 10/2013 ............ H04W 36/24
GB    2489770 A     10/2012
(Continued)

OTHER PUBLICATIONS

"3rd Generation Partnership Project; Technical Specification Group Radio Access Network; Study on provision of low-cost Machine-Type Communications (MTC) User Equipment (UEs) based on LTE (Release 12)," Technical Report, 3GPP TR 36.888 V12.0.0, Jun. 2013, 55 pages.

(Continued)

*Primary Examiner* — Gregory B Sefcheck
*Assistant Examiner* — Srinivasa R Reddivalam
(74) *Attorney, Agent, or Firm* — BakerHostetler

(57) ABSTRACT

A communications device includes a transmitter configured to transmit in one of plural segments of an available channel bandwidth signals representing data via a wireless access interface to a mobile communications network, a receiver configured to receive in one of the plural segments signals representing the data via the wireless access interface from the mobile communications network, and a controller configured to control the transmitter and the receiver. The controller is configured in combination with the transmitter and the receiver to measure a relative quality of signals received by the receiver in each of the plural segments, to (Continued)

transmit a measurement report to the mobile communications network, the measurement report including the measured relative quality of signals in each of the plural segments, and wherein, upon predetermined conditions being met, to skip the measuring of the relative quality of signals received in one or more of the plural segments.

21 Claims, 6 Drawing Sheets

(51) Int. Cl.
*H04L 5/00* (2006.01)
*H04L 1/20* (2006.01)
*H04L 27/26* (2006.01)
*H04L 1/00* (2006.01)

(52) U.S. Cl.
CPC .............. *H04L 1/0029* (2013.01); *H04L 1/20* (2013.01); *H04L 5/0053* (2013.01); *H04W 4/70* (2018.02); *H04L 5/0005* (2013.01); *H04L 27/2601* (2013.01)

(56) References Cited

U.S. PATENT DOCUMENTS

| | | | |
|---|---|---|---|
| 2013/0114564 A1* | 5/2013 | Ogawa ................. | H04L 5/0023 370/330 |
| 2015/0131558 A1* | 5/2015 | Van Lieshout ... | H04W 36/0005 370/329 |
| 2015/0189644 A1* | 7/2015 | Lorca Hernando .. | H04B 7/0639 370/329 |
| 2018/0220319 A1* | 8/2018 | Kim ...................... | H04W 24/10 |

FOREIGN PATENT DOCUMENTS

| | | |
|---|---|---|
| JP | 2009-284252 A | 12/2009 |
| WO | 2013/171152 A1 | 11/2013 |

OTHER PUBLICATIONS

Harri Holma, et al., "LTE for UMTS of DMA and SD-FDMA Based Radio Access," John Wiley & Sons Limited, Jan. 2010, 8 pages.
International Search Report dated Oct. 17, 2016 in PCT/EP2016/067391 filed Jul. 21, 2016.

* cited by examiner

DEVICES AND METHODS FOR STOPPING CQI MEASUREMENTS ACCORDING TO BATTERY LEVEL OR UE MOBILITY IN A MULTICARRIER SYSTEM

CROSS-REFERENCE TO RELATED APPLICATIONS

The present application is based on PCT filing PCT/EP2016/067391 filed Jul. 21, 2016, and claims priority to European Patent Application 15 181 121.3, filed in the European Patent Office on Aug. 14, 2015, the entire contents of each of which being incorporated herein by reference.

TECHNICAL FIELD OF THE DISCLOSURE

The present disclosure relates to communications devices and methods, and more specifically to providing an arrangement in which a communications device may reduce power consumption when providing measurements on channel conditions.

Embodiments of the present disclosure consider situations concerning Low Complexity (or Low Cost) Machine Type Communication (LC-MTC) communications devices.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art or may not form part of the state of the art at the time of filing, are neither expressly or impliedly admitted as prior art or state of the art against the present invention.

Mobile (or wireless) telecommunication systems, such as those based on the Third Generation Project Partnership (3GPP) defined Universal Mobile Telecommunication System (UMTS) and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is increasing rapidly and expected to continue to increase. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network.

The anticipated widespread deployment of third and fourth generation networks has led to the parallel development of a number of new infrastructure architectures involving a variety of classes of devices, of wireless access point units and of applications which may require different data rates, coverage areas or transmission powers. Although there are applications which require high data rates to support their operation, there are some applications in which high data rates are not required. Indeed there are some applications which are expected to be provided by more simple, less complicated communications devices such as those supporting machine type communications (MTC). Such devices are also expected to be low power devices having applications which tend to be low-throughput and high-latency, and may include a relatively inexpensive low complexity transmitter and receiver. Such devices may also be disposed in locations in which radio communications conditions can make transmission and reception of signals more difficult. MTC applications are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples may include relay nodes which provide assistance to local terminals communicating with a base station.

3GPP are presently specifying in a work item [1] a Low Complexity (or Low Cost) Machine Type Communication (LC-MTC) communications device. The main features of such a device are low complexity (i.e. low cost), coverage enhancement and reduced power consumption.

Power consumption, and therefore cost, may be reduced by restricting an LC-MTC communications device to operate within a narrower frequency range, i.e., a narrowband, than a typical communications device or MTC communications device. The system bandwidth may be divided into a number of narrowbands, and the LC-MTC communications device may be expected to be able to tune into any of these narrowbands. The network may typically instruct the LC-MTC communications device to measure and report on the channel conditions of each of these narrowbands, so as to select the most suitable frequency resources to transmit data to the LC-MTC device. However, providing regular reports on the channel conditions for multiple narrowbands leads to relatively high power consumption at the LC-MTC communications device.

Embodiments of the present disclosure therefore aim to provide solutions to save power at the LC-MTC communications device when an operating bandwidth is divided into a number of narrowbands, and the LC-MTC communications device is operable to measure and report on the channel conditions of each of these narrowbands.

SUMMARY OF THE DISCLOSURE

According to an example embodiment of the present disclosure there is provided a communications device for transmitting data to and receiving data from a mobile communications network comprising one or more infrastructure equipment. The communications device comprises a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface. The controller is configured in combination with the transmitter and the receiver to measure a relative quality of signals received by the receiver in each of the plurality of segments, to transmit a measurement report to the mobile communications network, the measurement report comprising the measured relative quality of signals in each of the plurality of segments, and wherein, upon predetermined conditions being met, to skip the measuring of the relative quality of signals received in one or more of the plurality of segments.

According to another example embodiment of the present disclosure, there is provided a communications device for transmitting data to and receiving data from a mobile communications network comprising one or more infrastructure equipment. The communications device comprises a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface. The controller is configured in combination with the transmitter and the receiver to measure a relative quality of signals received by the receiver in each of the plurality of segments, to transmit a measurement report to the mobile communications network, the measurement report comprising the measured relative quality of signals in each of the plurality of segments, and wherein, upon predetermined conditions being met, to skip the transmitting of the measurement report to the mobile communications network.

Various further aspects and features of the present technique are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts, and wherein.

DESCRIPTION OF EXAMPLE EMBODIMENTS

Figure 1:
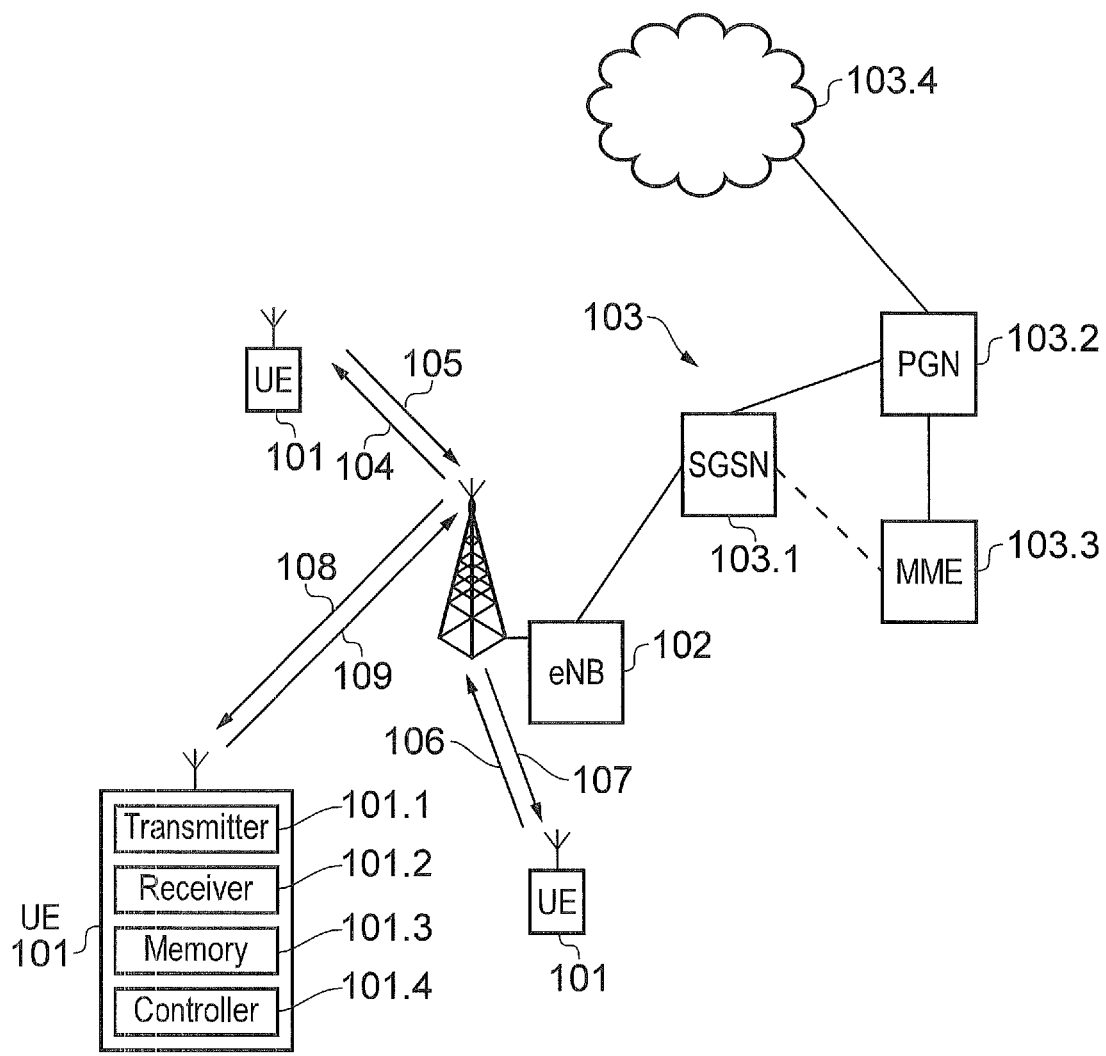
FIG. 1 provides a schematic diagram of a mobile communications system.

Hereinafter preferred embodiments of the present technique will be described in detail with reference to the appended drawings. Note that, in this specification and appended drawings, structural elements that have substantially the same function and structure can be denoted with the same reference numerals, and repeated explanation of these structural elements may be omitted.

Mobile Telecommunications System

FIG. 1 provides a schematic diagram of a conventional mobile telecommunications system 100, where the system includes mobile communications terminals 101, infrastructure equipment 102 and a core network 103. The infrastructure equipment may also be referred to as a base station, network element, enhanced Node B (eNodeB) or a coordinating entity for example, and provides a wireless access interface to the one or more communications terminals within a coverage area or cell. The one or more mobile communications terminals may communicate data via the transmission and reception of signals representing data using the wireless access interface. The network entity 102 is communicatively linked to core network components such as a serving gateway support node 103.1, a packet data gateway 103.2, a mobility management entity 103.3, and an external network 103.4, which may be connected to one or more other communications systems or networks which have a similar structure to that formed from communications terminals 101 and infrastructure equipment 102. The core network may also provide functionality including authentication, mobility management, charging and so on for the communications terminals served by the network entity. The mobile communications terminals of FIG. 1 may also be referred to as communications terminals, user equipment (UE), terminal devices and so forth, and are configured to communicate with one or more other communications terminals served by the same or a different coverage area via the network entity. These mobile communications terminals 101 each include a transmitter 101.1, a receiver 101.2, a memory 101.3 and a controller 101.4. These communications may be performed by transmitting and receiving signals representing data using the wireless access interface over the two way communications links represented by lines 104 to 109, where 104, 106 and 108 represent downlink communications from the network entity to the communications terminals and 105, 107 and 109 represent the uplink communications from the communications terminals to the network entity. The communications system 100 may operate in accordance with any known protocol, for instance in some examples the system 100 may operate in accordance with a 3GPP Long Term Evolution (LTE) standard where the network entity and communications terminals are commonly referred to as eNodeB and UEs, respectively.

LTE Wireless Access Interface

A brief description of the LTE wireless access interface is explained in the following paragraphs with reference to FIGS. 2 and 3 to support the explanation of the example embodiments of the present technique which are provided in the following paragraphs.

Figure 2:
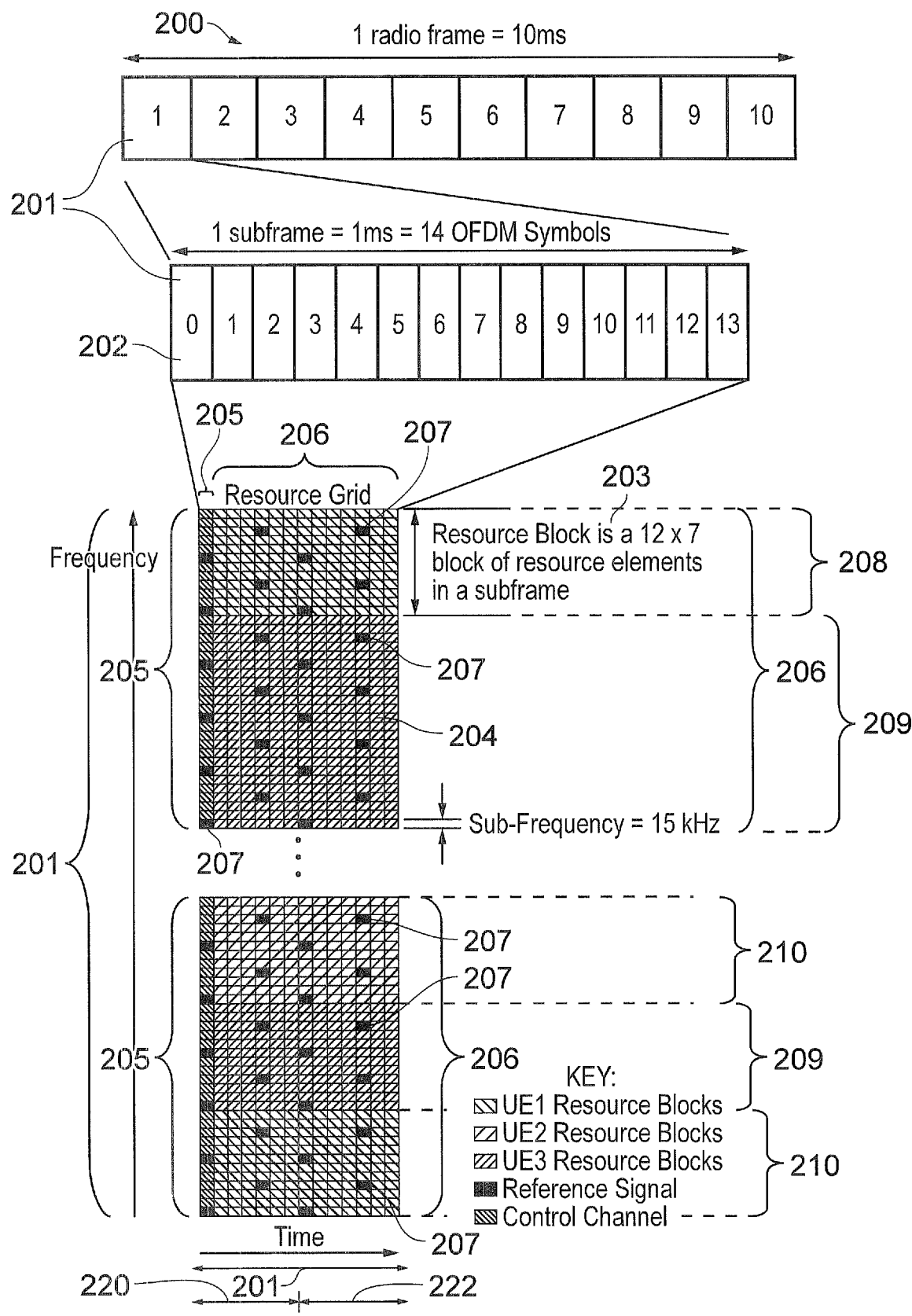
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot 220, 222 may be divided into physical resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [2].

Resources within the PDSCH may be allocated by an eNodeB to communications terminals (UEs) being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location of their allocated resources within the PDSCH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
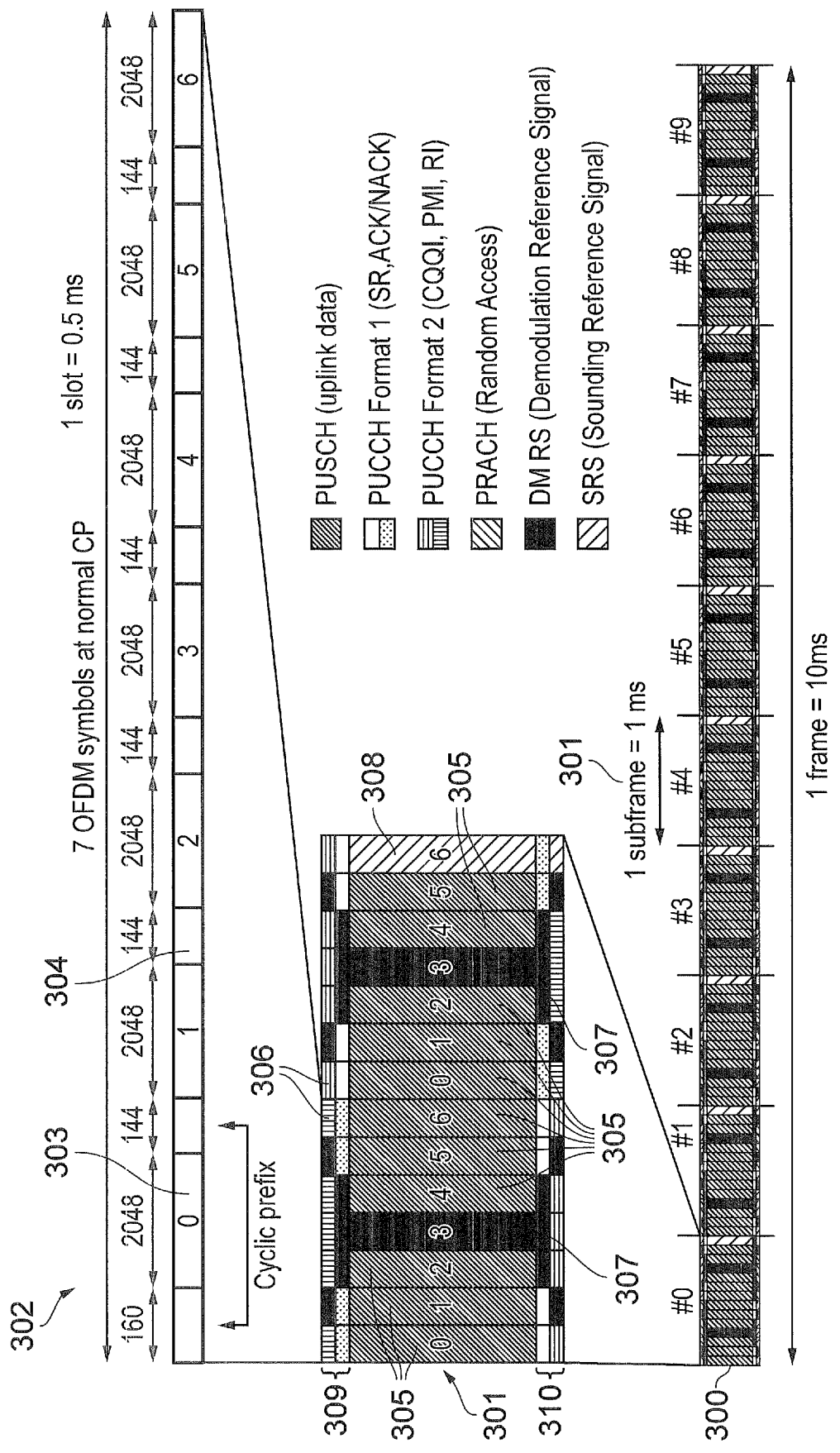
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to ten subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example; a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [2].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

UMTS/LTE Mobile Telecommunications System

Figure 4:
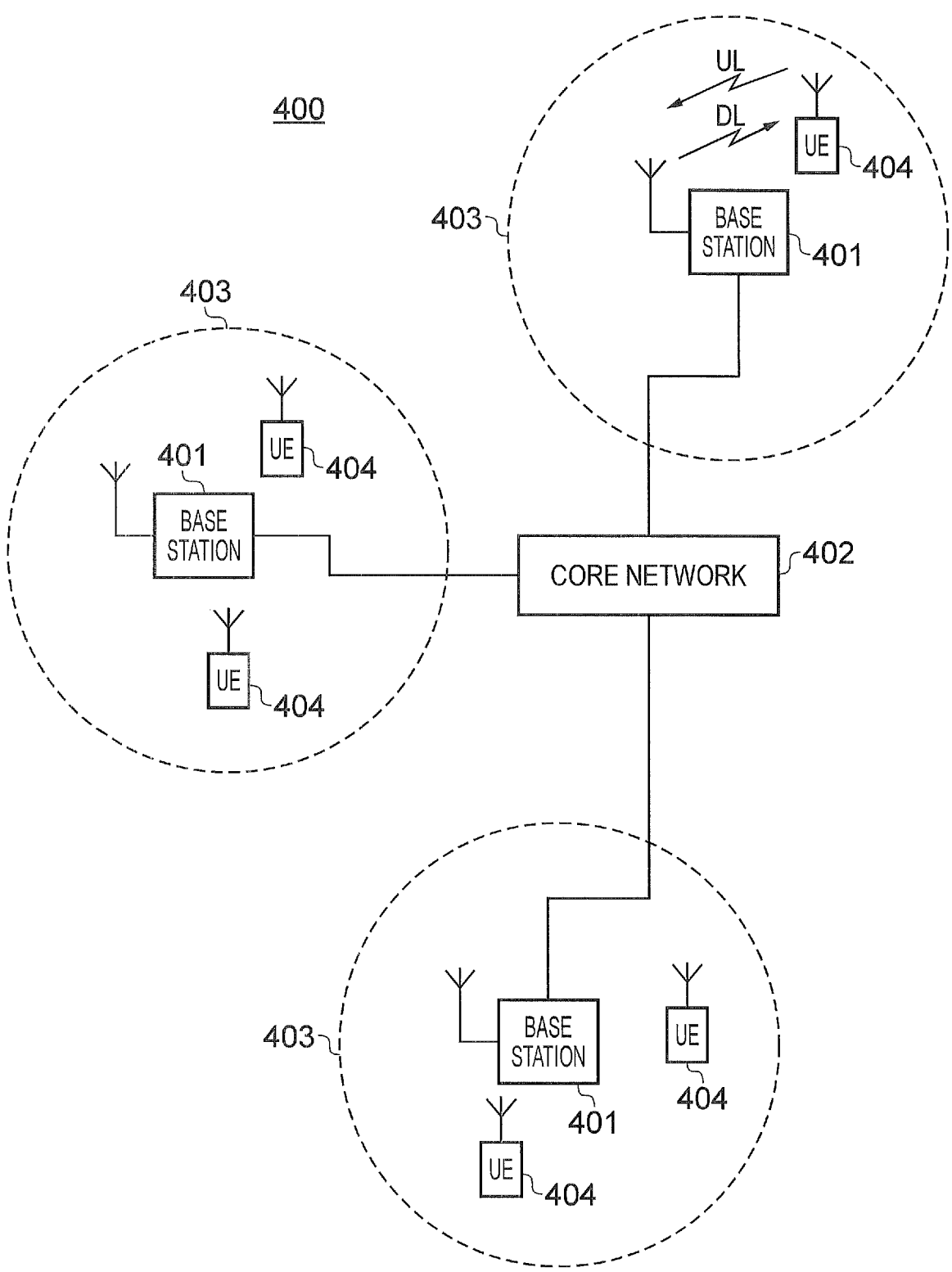
FIG. 4 provides a schematic diagram of a mobile communications system according to an example of an LTE standard.

FIG. 4 provides a schematic diagram illustrating some basic functionality of a conventional mobile telecommunications network/system, using for example a 3GPP defined UMTS and/or Long Term Evolution (LTE) architecture. The mobile telecommunications network/system 400 of FIG. 4 operates in accordance with LTE principles and which may be adapted to implement embodiments of the disclosure as described further below. Various elements of FIG. 4 and their respective modes of operation are well-known and defined in the relevant standards administered by the 3GPP (RTM) body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 400 includes a plurality of base stations 401 connected to a core network 402. Each base station provides a coverage area 403 (i.e. a cell) within which data can be communicated to and from terminal devices 404. Data is transmitted from base stations 401 to terminal devices 404 within their respective coverage areas 403 via a radio downlink. Data is transmitted from terminal devices 404 to the base stations 401 via a radio uplink. The uplink and downlink communications are made using radio resources that are licensed for use by the operator of the network 400. The core network 402 routes data to and from the terminal devices 404 via the respective base stations 401 and provides functions such as authentication, mobility management, charging and so on. Terminal devices may also be referred to as communications devices, communications terminals, mobile stations, user equipment (UE), user terminal, mobile terminal, mobile device, terminal, mobile radio, and so forth. Base stations may also be referred to as transceiver stations/infrastructure equipment/nodeBs/eNodeBs/eNodeB, eNB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 401 of FIG. 4 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 401 may be realised as any other types of base stations such as a NodeB and a base transceiver station (BTS). The base station 401 may include a main body (that is also referred to as a base station apparatus) configured to control radio communication, and one or more remote radio heads (RRH) disposed in a different place from the main body. In addition, various types of terminals, which will be described below, may each operate as the base station 401 by temporarily or semi-persistently executing a base station function.

Any of the communications devices 404 may be realised as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 404 may also be realised as a terminal (that is also referred to as a machine type communication (MTC) terminal) that performs machine-to-machine (M2M) communication. Furthermore, the terminal apparatus 404 may be a radio communication module (such as an integrated circuit module including a single die) mounted on each of the terminals In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carriers are available.

Low Complexity Machine Type Communications User Equipment

A work item on a Low Complexity (or Low Cost) MTC (Machine Type Communication) UE (LC-MTC) is being specified in 3GPP [1]. The main features of an LC-MTC UE are low complexity (i.e. low cost), coverage enhancement and reduced power consumption.

The main technique to reduce complexity/cost for LC-MTC UE is to restrict the UE to operate within 6 physical resource blocks (PRBs), a unit of allocation in an LTE wireless access interface. This system bandwidth is therefore divided into multiple 6 PRBs (of roughly 1.4 MHz each) narrowbands and the LC-MTC UE is expected to be able to tune into any of these narrowbands.

In legacy systems, UEs are able to receive signals across the entire system bandwidth and hence can measure the entire bandwidth in a single measurement. Hence, there is no need to provide measurement opportunities or for the UE to retune and cycle through individual narrowbands.

In the coverage enhancement (CE) feature, the coverage for LC-MTC is extended by 15 dB (relative to that of Cat-1 UEs). CE is a technique which has been proposed to improve a likelihood of communications devices to receive signals transmitted by a mobile communications network using an existing transmission format is to repeat a transmission of a signal representing a message from a mobile communications network. A receiver can combine the repeatedly received message to improve a likelihood of correctly detecting the message. Therefore a mobile communications network can be arranged to extend its radio coverage, particularly for less complicated mobile communications devices.

In the legacy operation, the UE would perform measurements on its radio condition and feedback (a measurement report) these measurements to the eNodeB. The feedback can be in the form of RRC message (layer 3) or Channel State Information (layer 1). Such feedbacks allow the network to assign the UE to the most suitable cell and for the case of CSI, the eNodeB is able to allocate resources that is suitable to the UE's radio condition.

Typically, the network would instruct a UE to measure and report the channel/radio condition of all the frequency resource within the system bandwidth. This allows the eNodeB to select the most suitable frequency resource to transmit data to the UE, i.e. allowing the eNodeB to perform frequency selective scheduling. Since an LC-MTC UE is restricted to operate within a narrowband, it is unable to measure a narrowband while receiving data in another narrowband. In order to provide measurement on all frequency resources, an LC-MTC UE would need to retune to all the narrowbands and measure each of them one at a time. It should be appreciated that performing measurement over a prolonged period due to the need to retune to multiple narrowbands, would lead to higher power consumption at the LC-MTC UE.

Recognising these issues in LC-MTC UE in performing measurement, the following potential solutions were proposed:
- Network to provide measurement opportunities for the LC-MTC UE where the LC-MTC UE is not expected to receive data, and thereby can retune to another narrowband to perform measurement.
- Instead of asking the LC-MTC UE to perform measurement of all the narrowbands in the system bandwidth (i.e. all frequency resources), the network can configure the LC-MTC UE to only provide feedback on a subset of narrowbands.
- The LC-MTC UE can be configured to only provide aperiodic feedback, for example, the LC-MTC UE needs only send a feedback if the radio condition changes by a predefined delta.

The first proposal solves the problem of requiring UE to receive in one narrowband and measure in another narrowband. However, cycling through all the narrowbands would consume power. The second proposal is dependent upon the eNodeB configuration. Typically, the network favours more feedback than less feedback since this allows it to better manage its resource. The third proposal reduces the number of feedbacks or measurement reports but the amount of measurement is the same, since the LC-MTC UE would still need to perform such measurements in order to determine whether the radio condition has changed.

The aim of the present disclosure is to provide a mechanism for the LC-MTC UE to reduce its power consumption in performing measurements.

Reduction of Power Consumption at the LC-MTC UE

According to an example embodiment of the present disclosure there is provided a communications device for transmitting data to and receiving data from a mobile communications network comprising one or more infrastructure equipment. The communications device comprises a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface. The controller is configured in combination with the transmitter and the receiver to measure a relative quality of signals received by the receiver in each of the plurality of segments, to transmit a measurement report to the mobile communications network, the measurement report comprising the measured relative quality of signals in each of the plurality of segments, and wherein, upon predetermined conditions being met, to skip the measuring of the relative quality of signals received in one or more of the plurality of segments.

It is envisaged that each of the plurality of segments could be equally sized, or one of a different number of sizes.

Figure 5:
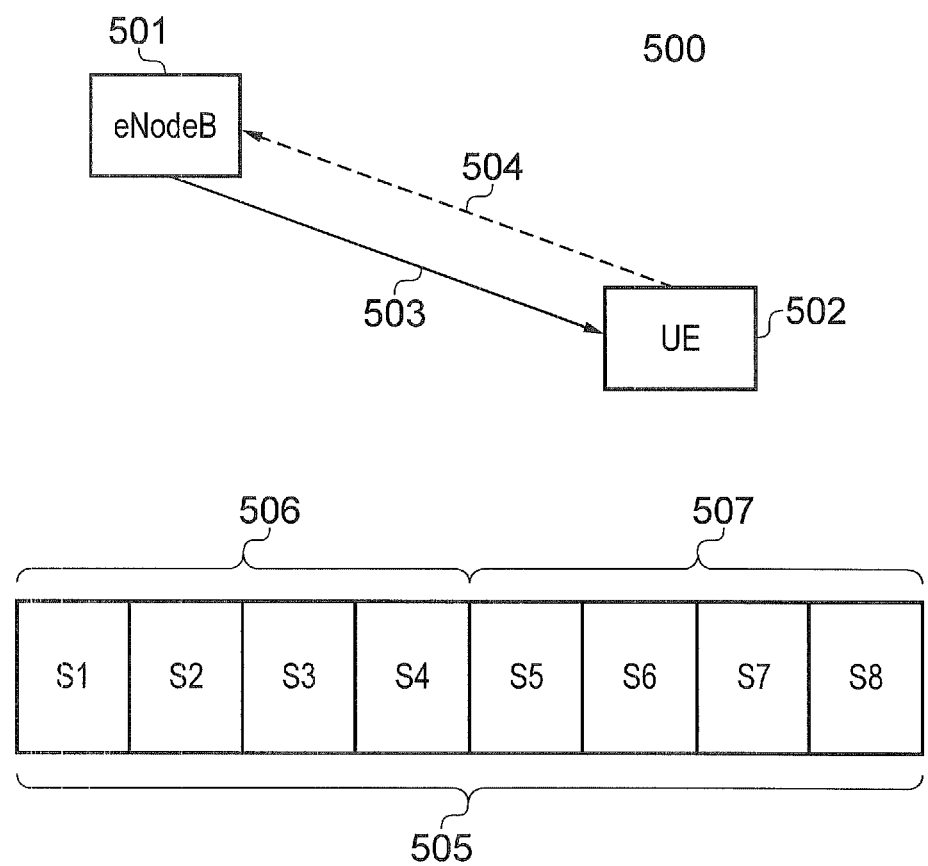
FIG. 5 illustrates an example mobile telecommunications network in accordance with an example embodiment of the present disclosure.

FIG. 5 illustrates an example mobile telecommunications network 500 in accordance with the above example embodiment of the present disclosure. The mobile telecommunications network comprises an infrastructure equipment 501 (in this example an eNodeB) and a communications device 502 (in this example an LC-MTC UE). The UE 502 is configured to receive from the eNodeB 501 signals 503 in a number of segments or narrowbands (or PRBs) of an available channel bandwidth. The UE 502 is configured to measure the channel state and characteristics for each of the narrowbands using these received signals 503, and transmit the feedback (or measurement report) 504 to the eNodeB 501. Dependent on some predetermined conditions or criteria, the UE 502 may skip the measuring of some of the received signals 503, thus saving power, and the feedback or measurement report 504 may therefore contain channel state and characteristic information about fewer of the narrowbands.

An example bandwidth 505 may comprise, for example, eight narrowbands S1 to S8. The UE 502 may receive signals 503 from each of the narrowbands S1 to S8 across the entire bandwidth 505. However, the predetermined conditions or criteria may be met, and the UE 502 may for example measure only narrowbands S1 to S4 506, and skip the measuring of narrowbands S5 to S8 507, thus saving power. When the predetermined conditions or criteria are not met, the UE 502 will measure the signals 503 and report the measurements 504 as instructed by the eNodeB 501.

The UE may already be aware of the set of narrowbands it is to measure and feedback to the eNodeB on. Alternatively, the UE may receive from the eNodeB a measurement set, wherein the measurement set comprises an indication of the narrowbands in which to measure of the relative quality of signals received.

Examples of the said predetermined conditions or criteria may be (and are not limited to) when the UE's battery life drops below a defined threshold or the UE's radio condition is such that its speed exceed a defined threshold where earlier measurements may no longer be valid. In other words, the predetermined conditions may comprise the UE detecting that its battery level has fallen below a first predetermined threshold, or that it is moving at a speed greater than a second predetermined threshold. The decision based on the predetermined conditions or criteria being met may be made at the UE. Alternatively, the decision may be made at the eNodeB and signalled to the UE. In other words, the UE may receive an indication of the first predetermined threshold and/or the second predetermined threshold from the eNodeB.

Clearly, with the example of the predetermined conditions being that the UE's battery life drops below a defined threshold, should the battery level already be low, it would be undesirable to continue consuming power by measuring all available narrowbands. Similarly, when the UE is moving so fast that measured conditions become out-of-date or invalid quickly, it would be undesirable to continue consuming power by measuring all available narrowbands.

The said measurements can be radio resource control (RRC) measurements or channel state information (CSI) reports. In an embodiment of the present disclosure, the eNodeB may configure multiple sets of measurements, where one of the sets is a full measurement and the remaining sets contain reduced measurement (i.e. measurements that the UE can skip). The parameters for criteria can also be configured by the eNodeB. This can be a RRC configuration. The UE can therefore select one of these sets of measurements to use depending on the criteria. This embodiment allows the eNodeB control on the measurement and provides an added advantage in that when the UE uses a set that is not the full set, the eNodeB knows exactly the condition of the UE (since the eNodeB configures these criteria). In other words, the UE may be configured to receive from the eNodeB a plurality of measurement sets, wherein a first of the plurality of measurement sets comprises an indication of the plurality of segments in which to measure the relative quality of signals received, and one or more of the other measurement sets comprises an indication of one or more segments in which to measure of the relative quality of signals received, wherein the number of the one or more segments in the one or more of the other measurement sets is lower than the number of the plurality segments in the first of the plurality of measurement sets, and to select, upon the predetermined conditions being met, one of the measurement sets from the plurality of measurement sets.

In an embodiment of the present disclosure, the UE may request from the eNodeB a reduced measurement set, when it determines that it will not be able to measure all of the narrowbands in the full measurement set. In other words, the communications device is configured to determine that the communications device is unable to measure all of the plurality of segments in the first of the measurement sets, and consequently to transmit to the one of the one or more infrastructure equipment a request for another of the one or more of the other measurement sets to be transmitted to the communications device.

In an embodiment of the present disclosure, the said skipped measurements can be identified by the narrowband in which the measurement is to be performed/is not performed by the UE. As described previously, the network can configure a set of narrowbands for the UE to measure. In this embodiment, when the said criteria are met, the UE would skip measuring some narrowbands. The number of narrowbands that it can skip can be predefined. In other words, the number of segments in which to skip the measuring of the relative quality of signals received in the one or more of the other measurement sets is predefined. For example, the UE can at the minimum provide measurements for 2 narrowbands. In another example, the number of narrowbands that is skipped is proportional to the UE's battery power or speed. In other words, the number of segments in which to skip the measuring of the relative quality of signals received in the one or more of the other measurement sets is proportional to the battery level of the communications device, or the number of segments in which to skip the measuring of the relative quality of signals received in the one or more of the other measurement sets is proportional to the speed at which the communications device is moving. In addition to reducing the measurement and reducing battery power consumption, this embodiment has the advantage that the measurements can be completed faster and thereby providing more recent radio conditions to the network.

Figure 6:
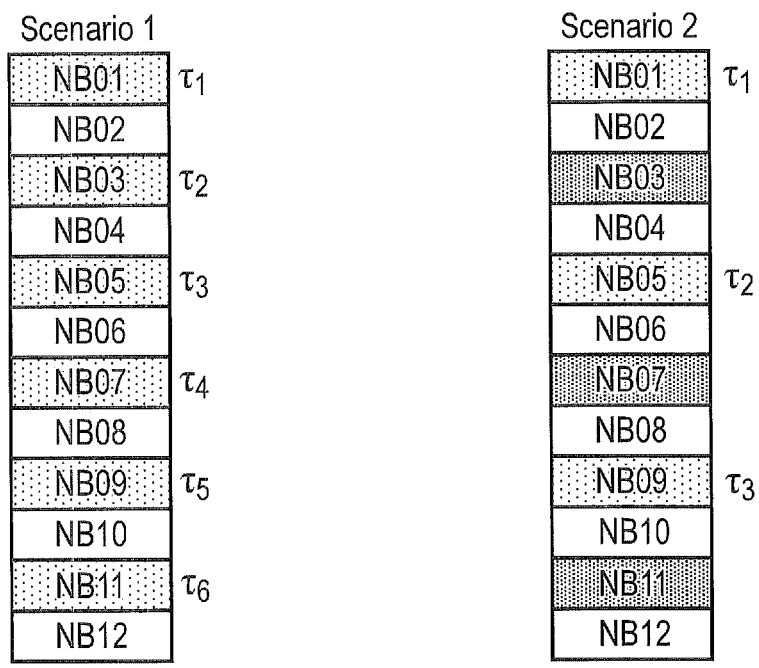
FIG. 6 illustrates an example of skipping the measurement of narrowbands in accordance with an example embodiment of the present disclosure.

FIG. 6 illustrates an example of skipping the measurement of narrowbands in accordance with an example embodiment of the present disclosure. In this example, the UE may, in Scenario 1, be configured to measure 6 narrowbands (i.e. shaded narrowbands NB1, NB3, NB5, NB7, NB9 and NB11). These measurements may be performed up until time $T_6$. If, for example, the UE is moving or the channel condition is fast, the earlier measurements such as those for narrowbands NB1 and NB3 may no longer be valid. However, instead, the UE may, in Scenario 2, be configured to measure 3 of its allocated narrowbands (i.e. shaded narrowbands NB1, NB5 and NB9) but configured to skip the measurement of 3 others of its allocated narrowbands (i.e. darkly shaded narrowbands NB3, NB7 and NB11). In this second scenario, the UE will be able to complete the measurements in time $T_3$ and provide more accurate feedback/measurement reports to the eNodeB. The embodiments provided in accompaniment to FIG. 6 recognise that it may be better to provide accurate, but less, information rather than a lot of mostly invalid measurements to the eNodeB.

In an embodiment of the present disclosure, the measurements (e.g. narrowbands) that are skipped, such as those darkly shaded in Scenario 2 of FIG. 6, the UE may provide an estimate for these skipped measurements. The estimate can based on interpolation or any other kind of appropriate estimation technique. Alternatively, the eNodeB can perform the estimates or interpolations. The UE can indicate in the feedback (measurement report) either which narrowbands it has skipped, or which narrowbands it has measured, or which measurements are estimated by the UE. Methods of indicating the measured/unmeasured narrowbands include, but are not limited to:

- a bitmap indicating which narrowbands have been measured—in other words the measurement report comprises an indication of one or more of the plurality of segments in which the relative quality of signals received was measured.
- a bitmap indicating which narrowbands have not been measured—in other words the measurement report comprises an indication of the one or more of the plurality of segments in which the measuring of the relative quality of signals received was skipped.

a start index and periodicity indication of which narrowbands have/have not been measured (e.g. for Scenario 2 of FIG. 6, the UE could indicate "start index=NB01, periodicity=2", meaning that the first reported narrowband is NB01 and the UE reports on every second configured narrowband)

a bit indicating whether the UE is reporting narrowbands that have been measured, or narrowbands that have not been measured (if the UE skips many narrowbands, UL messaging might be smaller if it reports measured narrowbands, conversely if only a few narrowbands are skipped, UL messaging might be smaller if it reports non-measured narrowbands)—in other words the measurement report comprises an indication of whether the measurement report is reporting the one or more of the plurality of segments in which the relative quality of signals received was measured, or if the measurement report is reporting the one or more of the plurality of segments in which the measuring of the relative quality of signals received was skipped.

At least in normal coverage, periodic reporting such as CSI can be configured by the network so as to enable the UE to provide periodic reports.

In another embodiment, the UE can provide partial reports in such periodic reporting. In other words, to transmit a plurality of measurement reports to the mobile communications network, each of the measurement reports comprising the measured relative quality of signals in each of one or more the plurality of segments.

Figure 7:
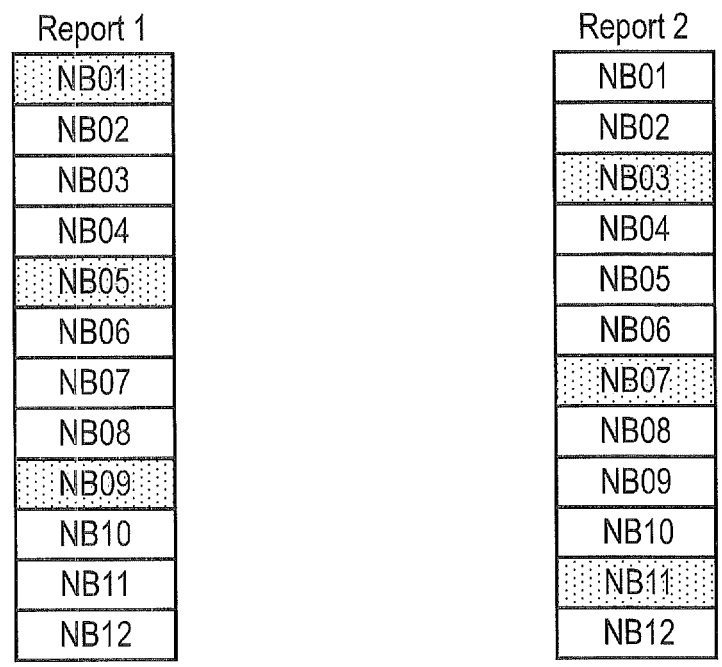
FIG. 7 illustrates an example of partial measurement reports in accordance with an example embodiment of the present disclosure.

FIG. 7 illustrates an example of partial measurement reports in accordance with an example embodiment of the present disclosure. The UE may be, for example, configured to provide CSI feedback for 6 narrowbands, namely NB01, NB03, NB05, NB07, NB09 & NB11 as in FIG. 6. Instead of reporting all 6 narrowbands, which would require the UE to cycle through 6 narrowbands in every report, the UE can provide partial reports, i.e. 3 narrowbands e.g. NB01, NB05 & NB09 in FIG. 7 in a first report and the remaining narrowbands, e.g. NB03, NB07 & NB11 in FIG. 7 in a second report. It should be appreciated that the partial reporting can be split to more than two reports. In partial reporting, the eNodeB would only get the desired report (i.e. all 6 narrowbands) after it has collected all the partial reports, that is if each report is sent every 10 ms, instead of getting all 6 narrowbands within 10 ms, the eNodeB would get all 6 narrowband measurements after 20 ms (where it gets 3 narrowband reports every 10 ms).

As described previously, aperiodic reporting is proposed such that the UE only needs to send a feedback when the radio condition, e.g. the channel quality information (CQI) changes by a predefined threshold. In other words, the UE is configured to transmit the measurement report when the measured relative quality of signals in one or more of the plurality of segments changes from a previous measured relative quality of signals in the one or more of the plurality of segments by more than a third predetermined threshold.

In order for the UE to send a report, it requires uplink resources, which needs to be scheduled by the eNodeB. Without any prior uplink resource, the UE would need to perform a random access channel (RACH) process in order to obtain uplink resources. This would incur high overhead especially in coverage enhancement mode where the physical random access channel (PRACH) requires repetitions (it was agreed in 3GPP that aperiodic CSI reporting is supported in CE-mode), which would lead to high UE battery consumption, especially if there are many CQI changes.

Therefore in an embodiment, the eNodeB configures uplink resources (i.e. PUCCH) for the UE for periodic CSI reporting. In other words, the communications device is configured to receive from the one of the infrastructure equipment an indication of uplink segments in which the transmitter can transmit signals representing the data to the one of the infrastructure equipment, and to transmit the measurement report to the one of the infrastructure equipment in the indicated segments.

The UE on the other hand need not send any report up, i.e. it can transmit discontinuously (DTX) some of these uplink resources, thus saving power. That is, the UE skips some of the measurement reports and only reports if the change in radio condition (i.e. CQI) is greater than a predefined threshold. In other words, the communications device is configured to skip the transmitting of the measurement report to the infrastructure equipment when the measured relative quality of signals in one or more of the plurality of segments changes from the previous measured relative quality of signals in the one or more of the plurality of segments by less than the third predetermined threshold. This would require the eNodeB to be configured to detect DTX. If this was not the case, the eNodeB may assume that the UE transmits in every available slot where resources were provided.

In an embodiment, when the said criteria are met, the UE indicates to the network that it would no longer be able to provide the full measurement reports as configured by the network. It can further indicate a reduced set of measurements that it can provide to the network. The network can then configure the UE to feedback the reduced set of measurements. It should be appreciated that the invention is targeted at UE in normal and low CE-level but it can be equally applied for UE in deep CE-level if measurement feedbacks are required.

According to an example embodiment of the present disclosure, there is provided a communications device for transmitting data to and receiving data from a mobile communications network comprising one or more infrastructure equipment. The communications device comprises a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface. The controller is configured in combination with the transmitter and the receiver to measure a relative quality of signals received by the receiver in each of the plurality of segments, to transmit a measurement report to the mobile communications network, the measurement report comprising the measured relative quality of signals in each of the plurality of segments, and wherein, upon predetermined conditions being met, to skip the transmitting of the measurement report to the mobile communications network.

In accordance with the above example embodiment, the communications device may be configured to receive from the communications network an indication that receiver is not expected to receive in one or more of the plurality of segments signals representing data via the wireless access interface from the communications network, and to skip the measuring of the relative quality of signals received in the one or more of the plurality of segments.

In accordance with the above example embodiment, the communications device may be configured to receive from the communications network an indication that the communications device should transmit a measurement report comprising the measured relative quality of signals in a subset of the plurality of segments, wherein the subset of the plurality of segments does not comprise one or more of the other plurality of segments, and to transmit the measurement report to the communications network.

In accordance with the above example embodiment, the communications device may be configured to transmit the measurement report when the measured relative quality of signals in one or more of the plurality of segments changes from a previous measured relative quality of signals in the one or more of the plurality of segments by more than a predetermined threshold.

Embodiments of the present disclosure may provide several benefits to telecommunications systems and devices, particularly LC-MTC UE devices. These benefits include a reduction in consumed power, a reduction in operational costs, and an increase in efficiency and effectiveness.

Although many of the examples above have been illustrated with a simple user equipment, the same teachings apply to a terminal which is not associated with any particular object or person, or associated with a pedestrian, a vehicle, a bicycle, a building or any other suitable object or person. In the case of an object, the terminal may be embedded in the object (e.g. a vehicle may comprise a mobile terminal in which a SIM card can be inserted), may be associated or paired with the object (e.g. a terminal may set up a Bluetooth connection with a Bluetooth module of the vehicle) or may simply be placed in a position wherein it is travelling with the object without having any particular communicative connection with the object (e.g. in the pocket of a driver or passenger in a vehicle).

Additionally, the method steps discussed herein may be carried out in any suitable order. For example, steps may be carried out in an order which differs from an order used in the examples discussed above or from an order used anywhere else for listing steps (e.g. in the claims), whenever possible or appropriate. Thus, in some cases, some steps may be carried out in a different order, or simultaneously or in the same order.

As used herein, transmitting information or a message to an element may involve sending one or more messages to the element and may involve sending part of the information separately from the rest of the information. The number of "messages" involved may also vary depending on the layer or granularity considered.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

Embodiments of the disclosure can be referred to generally in the following numbered paragraphs.

1. A communications device for transmitting data to and receiving data from a mobile communications network comprising one or more infrastructure equipment, the communications device comprising a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface, wherein the controller is configured in combination with the transmitter and the receiver to measure a relative quality of signals received by the receiver in each of the plurality of segments, to transmit a measurement report to the mobile communications network, the measurement report comprising the measured relative quality of signals in each of the plurality of segments, and wherein, upon predetermined conditions being met, to skip the measuring of the relative quality of signals received in one or more of the plurality of segments.

2. A communications device as in paragraph 1, wherein the predetermined conditions comprise the controller detecting that a battery level of the communications device has fallen below a first predetermined threshold.

3. A communications device as in paragraph 1, wherein the predetermined conditions comprise the controller detecting that the communications device is moving at a speed greater than a second predetermined threshold.

4. A communications device as in paragraph 1, wherein the controller is configured in combination with the receiver to receive from one of the one or more infrastructure equipment via the wireless access interface a measurement set, wherein the measurement set comprises an indication of the plurality of segments in which to measure of the relative quality of signals received.

5. A communications device as in any preceding paragraph, wherein the controller is configured in combination with the receiver to receive from the one of the one or more infrastructure equipment via the wireless access interface an indication of the first predetermined threshold and/or the second predetermined threshold.

6. A communications device as in paragraphs 4 or 5, wherein the controller is configured in combination with the receiver to receive from the one of the one or more infrastructure equipment a plurality of measurement sets, wherein a first of the plurality of measurement sets comprises an indication of the plurality of segments in which to measure of the relative quality of signals received, and one or more of the other measurement sets comprises an indication of one or more segments in which to measure of the relative quality of signals received, wherein the number of the one or more segments in the one or more of the other measurement sets is lower than the number of the plurality segments in the first of the plurality of measurement sets, and to select, upon the predetermined conditions being met, one of the measurement sets from the plurality of measurement sets.

7. A communications device as in paragraph 6, wherein the number of segments in which to skip the measuring of the relative quality of signals received in the one or more of the other measurement sets is predefined.

8. A communications device as in paragraph 6, wherein the number of segments in which to skip the measuring of the relative quality of signals received in the one or more of the other measurement sets is proportional to the battery level of the communications device.

9. A communications device as in paragraph 6, wherein the number of segments in which to skip the measuring of the relative quality of signals received in the one or more of the other measurement sets is proportional to the speed at which the communications device is moving.

10. A communications device as in paragraph 6, wherein the controller is configured in combination with the transmitter and the receiver to determine that the communications device is unable to measure all of the plurality of segments in the first of the measurement sets, and consequently to transmit to the one of the one or more infrastructure equipment a request for another of the one or more of the other measurement sets to be transmitted to the communications device.

11. A communications device as in paragraph 1, wherein the controller is configured to estimate a relative quality of signals received in the one or more of the plurality of segments in which the measuring of the relative quality of signals received was skipped.

12. A communications device as in paragraph 11, wherein the estimating the relative quality of signals received in the one or more of the plurality of segments is based on interpolation.

13. A communications device as in paragraph 1, wherein the measurement report comprises an indication of one or more of the plurality of segments in which the relative quality of signals received was measured.

14. A communications device as in paragraph 1, wherein the measurement report comprises an indication of the one or more of the plurality of segments in which the measuring of the relative quality of signals received was skipped.

15. A communications device as in paragraph 13 or 14, wherein the measurement report comprises an indication of whether the measurement report is reporting the one or more of the plurality of segments in which the relative quality of signals received was measured, or if the measurement report is reporting the one or more of the plurality of segments in which the measuring of the relative quality of signals received was skipped.

16. A communications device as in paragraph 1, wherein the measurement report comprises a start index, which indicates a first of one or more of the plurality of segments in which the relative quality of signals received was measured, and a periodicity indication, which indicates a number of the plurality of segments in which the measuring of the relative quality of signals received was skipped between a previous of the one or more of the plurality of segments in which the relative quality of signals received was measured and a next of the one or more of the plurality of segments in which the relative quality of signals received was measured.

17. A communications device as in any preceding paragraph, wherein the controller is configured in combination with the transmitter to transmit a plurality of measurement reports to the mobile communications network, each of the measurement reports comprising the measured relative quality of signals in each of one or more the plurality of segments.

18. A communications device as in any preceding paragraph, wherein the controller is configured in combination with the transmitter to transmit the measurement report periodically.

19. A communications device as in any preceding paragraph, wherein the controller is configured in combination with the transmitter to transmit the measurement report when the measured relative quality of signals in one or more of the plurality of segments changes from a previous measured relative quality of signals in the one or more of the plurality of segments by more than a third predetermined threshold.

20. A communications device as in any preceding paragraph, wherein the controller is configured in combination with the receiver and the transmitter to receive from the one of the infrastructure equipment an indication of uplink segments in which the transmitter can transmit signals representing the data to the one of the infrastructure equipment, and to transmit the measurement report to the one of the infrastructure equipment in the indicated segments.

21. A communications device as in paragraph 20, wherein the controller is configured in combination with the transmitter to skip the transmitting of the measurement report to the infrastructure equipment when the measured relative quality of signals in one or more of the plurality of segments changes from the previous measured relative quality of signals in the one or more of the plurality of segments by less than the third predetermined threshold.

22. A method of controlling a communications device for transmitting data to and receiving data from a mobile communications network comprising one or more infrastructure equipment, the method comprising measuring a relative quality of signals received by the receiver in each of a plurality of segments of an available channel bandwidth, transmitting a measurement report to the mobile communications network, the measurement report comprising the measured relative quality of signals in each of the plurality of segments, and wherein, upon predetermined conditions being met, skipping the measuring of the relative quality of signals received in one or more of the plurality of segments.

23. Circuitry for a communications device for transmitting data to and receiving data from a mobile communications network comprising one or more infrastructure equipment, the communications device comprising a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface, wherein the controller is configured in combination with the transmitter and the receiver to measure a relative quality of signals received by the receiver in each of the plurality of segments, to transmit a measurement report to the mobile communications network, the measurement report comprising the measured relative quality of signals in each of the plurality of segments, and wherein, upon predetermined conditions being met, to skip the measuring of the relative quality of signals received in one or more of the plurality of segments.

24. A communications device for transmitting data to and receiving data from a mobile communications network comprising one or more infrastructure equipment, the communications device comprising a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface, wherein the controller is configured in combination with the transmitter and the receiver to measure a relative quality of signals received by the receiver in each of the plurality of segments, to transmit a measurement report to the mobile communications network, the measurement report comprising the measured relative quality of signals in each of the plurality of segments, and wherein, upon predetermined conditions being met, to skip the transmitting of the measurement report to the mobile communications network.

25. A communications device as in paragraph 24, wherein the controller is configured in combination with the receiver to receive from the communications network an indication that receiver is not expected to receive in one or more of the plurality of segments signals representing data via the wireless access interface from the communications network, and to skip the measuring of the relative quality of signals received in the one or more of the plurality of segments.

26. A communications device as in paragraph 24 or 25, wherein the controller is configured in combination with the transmitter and the receiver to receive from the communications network an indication that the communications device should transmit a measurement report comprising the measured relative quality of signals in a subset of the plurality of segments, wherein the subset of the plurality of segments does not comprise one or more of the other plurality of segments, and to transmit the measurement report to the communications network.

27. A communications device as in any of paragraph 24 to 26, wherein the controller is configured in combination with the transmitter to transmit the measurement report when the measured relative quality of signals in one or more of the plurality of segments changes from a previous measured relative quality of signals in the one or more of the plurality of segments by more than a predetermined threshold.

28. A method of controlling a communications device for transmitting data to and receiving data from a mobile communications network comprising one or more infrastructure equipment, the method comprising measuring a relative quality of signals received by the receiver in each of a plurality of segments of an available channel bandwidth, transmitting a measurement report to the mobile communications network, the measurement report comprising the measured relative quality of signals in each of the plurality of segments, and wherein, upon predetermined conditions being met, skipping the transmitting of the measurement report to the mobile communications network.

29. Circuitry for a communications device for transmitting data to and receiving data from a mobile communications network comprising one or more infrastructure equipment, the communications device comprising a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface, wherein the controller is configured in combination with the transmitter and the receiver to measure a relative quality of signals received by the receiver in each of the plurality of segments, to transmit a measurement report to the mobile communications network, the measurement report comprising the measured relative quality of signals in each of the plurality of segments, and wherein, upon predetermined conditions being met, to skip the transmitting of the measurement report to the mobile communications network.

REFERENCES

[1] 3GPP TR 36.888 V12.0.0, "Study on provision of low-cost MTC UEs based on LTE (Release-12)", June 2013.

[2] Holma H. and Toskala A., "LTE for UMTS OFDMA and SC-FDMA Based Radio Access", John Wiley & Sons Limited, January 2010.

The invention claimed is:

1. A communications device for transmitting data to and receiving data from a mobile communications network including one or more infrastructure equipment, the communications device comprising:

a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface, wherein the controller is configured in combination with the transmitter and the receiver:

to measure a relative quality of signals received by the receiver in each of the plurality of segments, and to transmit a measurement report to the mobile communications network, the measurement report comprising the measured relative quality of signals in each of the plurality of segments, wherein, upon predetermined conditions being met, to skip the measuring of the relative quality of signals received in one or more of the plurality of segments, and wherein the controller is configured in combination with the receiver:

to receive from one of the one or more infrastructure equipment via the wireless access interface a measurement set, wherein the measurement set comprises an indication of the plurality of segments in which to measure the relative quality of signals received, to receive from the one of the one or more infrastructure equipment a plurality of measurement sets, wherein a first of the plurality of measurement sets comprises an indication of the plurality of segments in which to measure of the relative quality of signals received, and one or more of other measurement sets of the plurality of measurement sets comprises an indication of one or more segments in which to measure of the relative quality of signals received, wherein the number of the one or more segments in the one or more of the other measurement sets is lower than the number of the plurality of segments in the first of the plurality of measurement sets, and to select, upon the predetermined conditions being met, a measurement set from the plurality of measurement sets.

2. The communications device as claimed in claim 1, wherein the predetermined conditions comprise the controller detecting that a battery level of the communications device has fallen below a first predetermined threshold.

3. The communications device as claimed in claim 1, wherein the predetermined conditions comprise the controller detecting that the communications device is moving at a speed greater than a second predetermined threshold.

4. The communications device as claimed in claim 1, wherein the controller is configured in combination with the receiver to receive from the one of the one or more infrastructure equipment via the wireless access interface an indication of a first predetermined threshold regarding a battery level of the communication device and/or a second predetermined threshold regarding a moving speed of the communications device.

5. The communications device as claimed in claim 1, wherein the number of segments in which to skip the measuring of the relative quality of signals received in the one or more of the other measurement sets is predefined.

6. The communications device as claimed in claim 1, wherein the number of segments in which to skip the measuring of the relative quality of signals received in the one or more of the other measurement sets is proportional to the battery level of the communications device.

7. The communications device as claimed in claim 1, wherein the number of segments in which to skip the measuring of the relative quality of signals received in the one or more of the other measurement sets is proportional to the speed at which the communications device is moving.

8. The communications device as claimed in claim 1, wherein the controller is configured in combination with the transmitter and the receiver to determine that the communications device is unable to measure all of the plurality of segments in the first of the measurement sets, and consequently to transmit to the one of the one or more infrastructure equipment a request for another of the one or more of the other measurement sets to be transmitted to the communications device.

9. The communications device as claimed in claim 1, wherein the controller is configured to estimate a relative quality of signals received in the one or more of the plurality of segments in which the measuring of the relative quality of signals received was skipped.

10. The communications device as claimed in claim 9, wherein the estimating the relative quality of signals received in the one or more of the plurality of segments is based on interpolation.

11. The communications device as claimed in claim 1, wherein the measurement report comprises an indication of one or more of the plurality of segments in which the relative quality of signals received was measured.

12. The communications device as claimed in claim 1, wherein the measurement report comprises an indication of the one or more of the plurality of segments in which the measuring of the relative quality of signals received was skipped.

13. The communications device as claimed in claim 11, wherein the measurement report comprises an indication of whether the measurement report is reporting the one or more of the plurality of segments in which the relative quality of signals received was measured, or if the measurement report is reporting the one or more of the plurality of segments in which the measuring of the relative quality of signals received was skipped.

14. The communications device as claimed in claim 1, wherein the measurement report comprises a start index, which indicates a first of one or more of the plurality of segments in which the relative quality of signals received was measured, and a periodicity indication, which indicates a number of the plurality of segments in which the measuring of the relative quality of signals received was skipped between a previous of the one or more of the plurality of segments in which the relative quality of signals received was measured and a next of the one or more of the plurality of segments in which the relative quality of signals received was measured.

15. The communications device as claimed in claim 1, wherein the controller is configured in combination with the transmitter to transmit a plurality of measurement reports to the mobile communications network, each of the measurement reports comprising the measured relative quality of signals in each of one or more of the plurality of segments.

16. The communications device as claimed in claim 1, wherein the controller is configured in combination with the transmitter to transmit the measurement report periodically.

17. The communications device as claimed in claim 1, wherein the controller is configured in combination with the transmitter to transmit the measurement report when the measured relative quality of signals in one or more of the plurality of segments changes from a previous measured relative quality of signals in the one or more of the plurality of segments by more than a third predetermined threshold.

18. The communications device as claimed in claim 1, wherein the controller is configured in combination with the receiver and the transmitter to receive from the one of the infrastructure equipment an indication of uplink segments in which the transmitter can transmit signals representing the data to the one of the infrastructure equipment, and to transmit the measurement report to the one of the infrastructure equipment in the indicated segments.

19. The communications device as claimed in claim 18, wherein the controller is configured in combination with the transmitter to skip the transmitting of the measurement report to the infrastructure equipment when the measured relative quality of signals in one or more of the plurality of segments changes from the previous measured relative quality of signals in the one or more of the plurality of segments by less than a third predetermined threshold.

20. Circuitry for a communications device for transmitting data to and receiving data from a mobile communications network including one or more infrastructure equipment, the communications device comprising:

a transmitter configured to transmit in one of a plurality of segments of an available channel bandwidth signals representing the data via a wireless access interface to the mobile communications network, a receiver configured to receive in one of the plurality of segments signals representing the data via the wireless access interface from the mobile communications network, and a controller configured to control the transmitter and the receiver to transmit in one of the plurality of segments and to receive in one of the plurality of segments the data via the wireless access interface, wherein the controller is configured in combination with the transmitter and the receiver:

to measure a relative quality of signals received by the receiver in each of the plurality of segments, to transmit a measurement report to the mobile communications network, the measurement report comprising the measured relative quality of signals in each of the plurality of segments, wherein, upon predetermined conditions being met, to skip the measuring of the relative quality of signals received in one or more of the plurality of segments, and wherein the controller is configured in combination with the receiver: to receive from one of the one or more infrastructure equipment via the wireless access interface a measurement set, wherein the measurement set comprises an indication of the plurality of segments in which to measure the relative quality of signals received, to receive from the one of the one or more infrastructure equipment a plurality of measurement sets, wherein a first of the plurality of measurement sets comprises an indication of the plurality of segments in which to measure of the relative quality of signals received, and one or more of other measurement sets of the plurality of measurement sets comprises an indication of one or more segments in which to measure of the relative quality of signals received, wherein the number of the one or more segments in the one or more of the other measurement sets is lower than the number of the plurality of segments in the first of the plurality of measurement sets, and to select, upon the predetermined conditions being met, a measurement set from the plurality of measurement sets.

21. A method of controlling a communications device for transmitting data to and receiving data from a mobile communications network including one or more infrastructure equipment, the method comprising:

measuring a relative quality of signals received by a receiver in each of a plurality of segments of an available channel bandwidth, transmitting a measurement report to the mobile communications network, the measurement report comprising the measured relative quality of signals in each of the plurality of segments, wherein, upon predetermined conditions being met, skipping the transmitting of the measurement report to the mobile communications network; and wherein a controller is configured in combination with the receiver:

to receive from one of the one or more infrastructure equipment via the wireless access interface a measurement set, wherein the measurement set comprises an indication of the plurality of segments in which to measure the relative quality of signals received, to receive from the one of the one or more infrastructure equipment a plurality of measurement sets, wherein a first of the plurality of measurement sets comprises an indication of the plurality of segments in which to measure of the relative quality of signals received, and one or more of other measurement sets of the plurality of measurement sets comprises an indication of one or more segments in which to measure of the relative quality of signals received, wherein the number of the one or more segments in the one or more of the other measurement sets is lower than the number of the plurality of segments in the first of the plurality of measurement sets, and to select, upon the predetermined conditions being met, a measurement set from the plurality of measurement sets.

* * * * *